(12) United States Patent
Sakai et al.

(10) Patent No.: US 8,783,834 B2
(45) Date of Patent: Jul. 22, 2014

(54) LIQUID EJECTING HEAD AND LIQUID EJECTING APPARATUS

(75) Inventors: Tomohiro Sakai, Chino (JP); Satoshi Kimura, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 378 days.

(21) Appl. No.: 13/044,324

(22) Filed: Mar. 9, 2011

(65) Prior Publication Data

US 2011/0221827 A1  Sep. 15, 2011

(30) Foreign Application Priority Data

Mar. 10, 2010  (JP) .................................. 2010-053823

(51) Int. Cl.
 *B41J 2/045* (2006.01)
 *H01L 41/00* (2013.01)
 *H02N 2/00* (2006.01)

(52) U.S. Cl.
 USPC ............................................ 347/68; 310/311

(58) Field of Classification Search
 None
 See application file for complete search history.

(56) References Cited

U.S. PATENT DOCUMENTS

| | | | |
|---|---|---|---|
| 2001/0054859 A1* | 12/2001 | Hammer et al. ............... | 310/363 |
| 2002/0098968 A1* | 7/2002 | Takahashi et al. ............ | 501/137 |
| 2007/0120899 A1* | 5/2007 | Ohnishi et al. ................. | 347/72 |
| 2008/0248265 A1* | 10/2008 | Naono et al. ................... | 428/209 |

FOREIGN PATENT DOCUMENTS

| | | |
|---|---|---|
| CN | 101200369 | 6/2008 |
| JP | 11-129474 | 5/1999 |

* cited by examiner

*Primary Examiner* — Matthew Luu
*Assistant Examiner* — Erica Lin
(74) *Attorney, Agent, or Firm* — Workman Nydegger

(57) ABSTRACT

There is provided a liquid ejecting head comprising a pressure generating chamber and a piezoelectric actuator having a piezoelectric material consisting of composite oxide. The composite oxide contains bismuth, sodium, barium, titanium, and zinc. A ratio of zinc content to the total amount of titanium and zinc is 0.35 mol % or more and 1.25 mol % or less.

7 Claims, 8 Drawing Sheets

Pr (REMANENT POLARIZATION VALUE) = 30 $\mu C/cm^2$,
Ec (COERCIVE ELECTRIC FIELD) = 37 kV/cm

MEASUREMENT CONDITIONS
MEASUREMENT FREQUENCY: 10 Hz
MEASUREMENT TEMPERATURE: 25°C

LIQUID EJECTING HEAD AND LIQUID EJECTING APPARATUS

CROSS-REFERENCE TO RELATED APPLICATIONS

This application claims the benefit of priority to Japanese Patent Application No. 2010-053823 filed Mar. 10, 2010, the contents of which are hereby incorporated by reference in their entirety.

BACKGROUND

1. Technical Field

The present invention relates to a liquid ejecting head and liquid ejecting apparatus each having a piezoelectric device which generates a pressure change inside a pressure generating chamber that is in communication with a nozzle opening.

2. Related Art

Typical examples of a liquid ejecting head to be provided on a liquid ejecting apparatus include an ink jet recording head having a configuration in which a pressure generating chamber that is in communication with a nozzle opening that ejects ink droplets is formed by partially using a vibrating plate and in which a piezoelectric device functions to deform the vibrating plate to apply a pressure to ink inside the pressure generating chamber with the result that ink droplets are ejected from the nozzle opening. Examples of the piezoelectric device to be provided on the ink jet recording head include a vertical vibration-type piezoelectric device and a flexural vibration-type piezoelectric device. Examples of the vertical vibration-type piezoelectric device include one of a type formed as follows: producing a piezoelectric device-forming member (piezoelectric vibrating plate) as a result of stacking a common internal electrode and an individual internal electrode with a piezoelectric material interposed therebetween; fixing the piezoelectric device-forming member onto a fixing substrate; and cutting the resultant piezoelectric device-forming member in a comb-like shape by using a wire saw apparatus (see, JP-A-11-129474, for example).

A piezoelectric material used for such a piezoelectric device is required to have high piezoelectric properties (strain amount, for example). Typical examples of such a material include lead zirconate titanate (PZT).

However, in recent years, a piezoelectric material containing a low amount of lead has been required in terms of environmental concern. Therefore, various materials each having a perovskite structure represented by a general formula $ABO_3$ have been supposed.

Unfortunately, the lead-free piezoelectric material has a small strain amount relative to a case in which PZT is used, and therefore a piezoelectric material that satisfies a large strain amount and excellent piezoelectric properties is required.

Such a problem occurs not only in an ink jet recording head but in a liquid ejecting head that ejects a liquid other than ink.

SUMMARY

An advantage of some aspects of the invention is that it provides a liquid ejecting head and liquid ejecting apparatus which are each capable of reducing environmental loads and which each have excellent piezoelectric properties.

According to an aspect of the invention, there is provided a liquid ejecting apparatus including: a pressure generating chamber that is in communication with a nozzle opening that ejects a liquid; and a piezoelectric actuator having a piezoelectric material layer and an electrode layer, the piezoelectric material layer being made of composite oxide having a perovskite structure, and the electrode layer being disposed on the piezoelectric material layer. The composite oxide contains bismuth, sodium, barium, titanium, and zinc. A ratio of zinc content to the total amount of titanium and zinc is in the range from 0.35 mol % to 1.25 mol %.

By virtue of this advantage, a lead-free piezoelectric device that exhibits a large strain amount can be provided, thereby being able to reduce environmental loads and being able to secure excellent piezoelectric properties.

Furthermore, it is preferable that the composite oxide further contains another type of metal. By virtue of this advantage, a strain amount can be further increased, and piezoelectric properties can be further enhanced.

It is preferable that the composite oxide further contains lithium and that a ratio of lithium content to the total amount of sodium and lithium is in the range from 5 mol % to 8 mol %. By virtue of this advantage, the strain amount of the piezoelectric device can be further increased, and piezoelectric properties can be further enhanced.

Furthermore, it is preferable that a ratio of zinc content to the total amount of titanium and zinc is less than or equal to 0.90 mol % in the composite oxide. By virtue of this advantage, a piezoelectric device exhibiting a large strain amount and having small tan δ (dielectric loss) can be provided, and piezoelectric properties can be further enhanced.

Furthermore, it is preferable that a ratio of zinc content to the total amount of titanium and zinc is greater than or equal to 0.40 mol % in the composite oxide. By virtue of this advantage, a piezoelectric device exhibiting a large strain amount and having large ∈r (relative permittivity) can be provided, and piezoelectric properties can be further enhanced.

Furthermore, according to another aspect of the invention, there is provided a liquid ejecting apparatus including the liquid ejecting head having any of the above advantages.

By virtue of this advantage, a liquid ejecting apparatus that enables print quality to be improved can be provided.

It is preferable that the liquid ejecting apparatus has two or more liquid ejecting heads having any of the above advantages. By virtue of this advantage, a liquid ejecting apparatus that ejects different liquids can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Specific embodiments of the invention will be hereinafter described in detail.

First Embodiment

Figure 1:
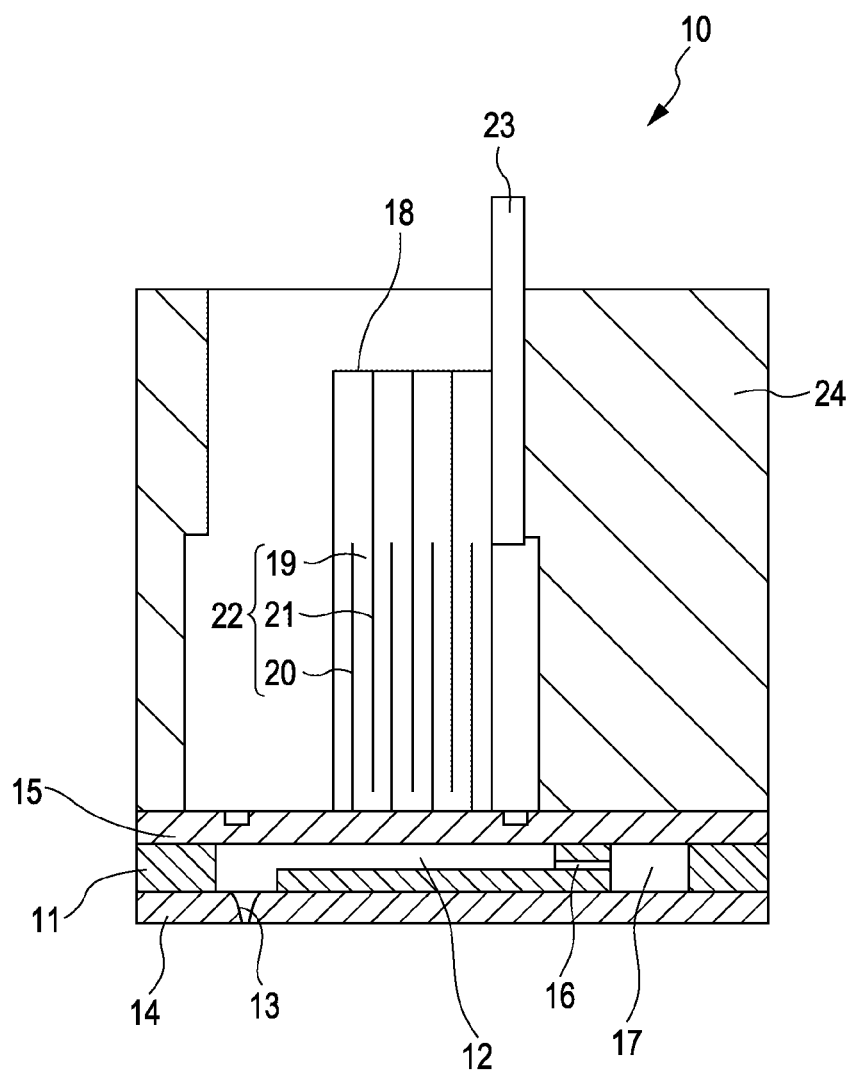
FIG. 1 is a cross-sectional view illustrating a recording head according to a first embodiment of the invention.

FIG. 1 is a cross-sectional view illustrating an example of an ink jet recording head which is an example of a liquid ejecting head according to a first embodiment of the invention.

An ink jet recording head 10 illustrated in FIG. 1 has a vertical vibration-type piezoelectric device. In the ink jet recording head 10, a channel forming substrate 11 has a plurality of pressure generating chambers 12 that are provided in parallel with each other. The channel forming substrate 11 is disposed between a nozzle plate 14 and a vibrating plate 15 to form a sealing state, the nozzle plate 14 having nozzle openings 13 that are formed so as to correspond to respective pressure generating chambers 12. A reservoir 17 is formed in the channel-forming substrate 11, the reservoir 17 being in communication with the pressure generating chambers 12 through respective ink supplying ports 16 so as to serve as a common ink chamber of a plurality of pressure generating chambers 12. The reservoir 17 is connected to an ink cartridge (not illustrated). The ink jet recording head 10 has a piezoelectric device unit and a head case 24, the piezoelectric device unit having piezoelectric devices 18 that are formed on the vibrating plate 15 so as to be positioned in regions that correspond to individual pressure generating chambers 12, and the head case 24 being fixed on the vibrating plate 15 and having an accommodating section in which the piezoelectric device unit is accommodated.

As described above, the piezoelectric devices 18 are provided such that the ends of the piezoelectric devices 18 abut on the side, which is opposite the pressure generating chamber 12, of the vibrating plate 15 so as to be positioned in regions corresponding to the pressure generating chambers 12. In the embodiment, the piezoelectric devices 18 integrally form a single piezoelectric device unit. Specifically, an electrode layer 20, a piezoelectric material layer 19, and an electrode layer 21 extend in a vertical direction and are alternately stacked such that the piezoelectric material layer 19 is sandwiched between the electrode layers 20 and 21, thereby forming a piezoelectric device-forming member 22. The piezoelectric device-forming member 22 is cut in a comb-like shape so as to correspond to respective pressure generating chambers 12, thereby forming the piezoelectric devices 18. Namely, in the embodiment, a plurality of the piezoelectric devices 18 are integrally formed. An inactive region that does not contribute to the vibration of each of the piezoelectric devices 18 (namely, the piezoelectric device-forming member 22), in other words the rear side of each of the piezoelectric devices 18, is fixed to a fixing substrate 23. Although not illustrated, in the vicinity of the end side of each of the piezoelectric devices 18, a circuit substrate having wires through which signals are supplied is connected to the side opposite the fixing substrate 23, the signals serving to drive the piezoelectric devices 18. In the embodiment, each of the piezoelectric devices 18 is formed as a piezoelectric actuator that functions to deform the vibrating plate 15, and the piezoelectric devices 18 and the fixing substrate 23 form the piezoelectric device unit.

The piezoelectric material layer 19 of the embodiment is made of composite oxide having a perovskite structure represented by a general formula $ABO_3$, and the composite oxide contains bismuth, sodium, barium, titanium, and zinc. The ratio of zinc content to the total amount of titanium and zinc is in the range from 0.35 mol % to 1.25 mol %. The piezoelectric material layer 19 is formed so as to contain bismuth, barium, sodium, titanium, and a predetermined amount of zinc in this manner, thereby being able to increase the strain amount of the piezoelectric material layer 19. For example, although details will be hereinafter described in examples, a piezoelectric constant (d33) is improved as compared with $(Bi,Na,Ba)TiO_3$ which does not contain zinc. In addition, a strain amount can be increased without significant increase of tan δ. In other words, the piezoelectric material layer 19 contains zinc in an amount that falls within the above range, so that the strain amount of the piezoelectric material layer 19 can be increased without significant increase of tan δ. Furthermore, viewing the result of a test that will be hereinafter described, it was found that a strain amount was reduced relative to a piezoelectric material layer made of composite oxide of $(Bi,Na,Ba)TiO_3$ in the case where the ratio of zinc content was less than 0.35 mol % and was greater than 1.25 mol %.

In the composite oxide, although content ratios of bismuth, sodium, and barium are not specifically limited, for example, the content ratio of sodium to the total amount of bismuth, sodium, and barium is preferably in the range from 41.0 mol % to 49.0 mol %, and the content ratio of barium to the total amount of bismuth, sodium, and barium is preferably in the range from 1.0 mol % to 15.0 mol %

Examples of the composite oxide of the embodiment include one of a type having a perovskite structure in which bismuth, sodium, and barium are located at the A site and in which titanium and zinc are located at the B site. Specifically, examples of the composite oxide include, but are not limited to, one of a type in which the ratio of the total molar amount of bismuth, sodium, and barium to the total molar amount of titanium and zinc is 1:1. For example, the relationship of (the total molar amount of bismuth, sodium, and barium)/(the total molar amount of titanium and zinc)=0.8 to 1.5 may be provided. The ratio of the total molar amount of bismuth, sodium, and barium to the total molar amount of titanium and zinc is changed to be optimized, thereby controlling the oxygen-deficient amount in a perovskite structure. Accordingly, crystal quality can be improved with the result that piezoelectric properties can be enhanced.

Furthermore, the ratio of zinc content to the total amount of titanium and zinc is preferably less than or equal to 0.90 mol %. Such a ratio is employed for the reason of being able to decrease tan δ of the piezoelectric devices 18, and the tan δ of the piezoelectric devices 18 can be reduced as compared with that of $(Bi,Na,Ba)TiO_3$, for example. The decreased tan δ causes a calorific value to be reduced, and thermal energy is reduced with the result that consumption energy can be reduced, thereby being able to achieve large piezoelectric displacement with low driving electricity.

Furthermore, the ratio of zinc content to the total amount of titanium and zinc is preferably greater than or equal to 0.40 mol %. Such a ratio is employed for the reason of being able to increase the relative permittivity of the piezoelectric devices 18, and the relative permittivity of the piezoelectric devices 18 can be increased as compared with that of $(Bi,Na,Ba)TiO_3$, for example.

An especially preferred ratio of zinc content to the total amount of titanium and zinc is in the range from 0.40 mol % to 0.90 mol %. Such a ratio is employed for the reason of being able to increase a strain amount, being able to decrease tan δ, and being able to increase a relative permittivity.

Furthermore, the piezoelectric material layer 19 may contain another type of metal, and such another type of metal is preferably contained in an amount corresponding to part of sodium content so as to replace the part of the sodium content. Specifically, in the case where another type of metal is contained, the content ratio of sodium with such another type of metal to the total amount of bismuth, sodium, barium, and such another type of metal is preferably in the range from 41.0 mol % to 49.0 mol %. Examples of such another type of metal include lithium (Li), potassium (K), rubidium (Rb), cesium (Cs), silver (Ag), magnesium (Mg), calcium (Ca), and strontium (Sr). In the case where the composite oxide contains lithium, the ratio of lithium content to the total amount of sodium and lithium is preferably in the range from 5 mol % to 8 mol %. Therefore, the strain amount can be further increased, and excellent piezoelectric properties can be provided.

In the ink jet recording head 10 having such configurations, the reservoir 17 is supplied with ink through an ink channel that is in communication with the ink cartridge, and then the ink is distributed to the pressure generating chambers 12 through the respective ink supplying ports 16. In practice, a voltage is applied to the piezoelectric devices 18 to contract the piezoelectric devices 18. Therefore, the vibrating plate 15 is deformed in conjunction with the contraction of the piezoelectric devices 18 (moved in an upper direction in the drawing) to increase the volume of the pressure generating chambers 12, so that the ink is drawn into the pressure generating chambers 12. The pressure generating chambers 12 are filled with the ink until the ink reaches the nozzle openings 13, and then a voltage applied to the electrode layers 20 and 21 of each of the piezoelectric devices 18 is turned off in accordance with a recording signal from a driving circuit, and then each of the contracted piezoelectric devices 18 expands to return to the original state thereof. Consequently, the vibrating plate 15 is also displaced to return to the original state thereof, and therefore the pressure generating chambers 12 are contracted, so that inner pressure is increased to eject ink droplets from the nozzle openings 13. Namely, in the embodiment, the vertical vibration-type piezoelectric devices 18 are each provided as a pressure generator that generates pressure changes in the pressure generating chambers 12.

The piezoelectric material layer 19 of the embodiment is made of the above composite oxide, and therefore a large strain amount and excellent piezoelectric properties can be provided. Namely, each of the piezoelectric devices 18 that is formed by employing the piezoelectric material layer 19 having such advantages can exhibit large piezoelectric displacement with low driving electricity and can therefore have excellent piezoelectric properties. The piezoelectric material layer 19 is made of the above lead-free piezoelectric material, thereby preventing adverse influence on the environment.

Zinc to be used for the piezoelectric material layer 19 is not expensive and is easily treated, and therefore the piezoelectric devices 18 can be easily produced at low production costs so as to have excellent piezoelectric properties.

An example of a method of manufacturing the piezoelectric devices 18 will be described below.

As the starting material of the piezoelectric material layer 19, metal powder of bismuth, sodium, barium, titanium, and an alloy of zinc and copper or powder of a metallic compound containing such metals is weighed so as to satisfy a targeted composition ratio. In this case, the blended amount of the compound is adjusted such that the ratio of zinc content to the total amount of titanium and zinc is in the range from 0.35 mol % to 1.25 mol % in the resultant product. Examples of a bismuth-containing metal or metallic compound include bismuth, bismuth oxide, and bismuth hydroxide. Examples of a sodium-containing metallic compound include sodium carbonate, sodium hydrogen carbonate, and sodium hydroxide. Examples of a barium-containing metal or metallic compound include barium, barium oxide, and barium carbonate. Examples of a titanium-containing metal or metallic compound include titanium and titanium oxide. Examples of a zinc-containing metal or metallic compound include zinc and zinc oxide. A metallic compound that compositely contains bismuth, sodium, barium, titanium, and zinc may be used, and examples of such a compound include bismuth sodium titanate, bismuth titanate, sodium bismuthate, barium titanate, and sodium zincate.

The weighed powder is mixed with pure water or is mixed with a liquid such as alcohol that is more volatile relative to pure water. Then, the resultant product is ground and mixed by using a grinder such as a ball mill and is then dried, thereby producing mixed powder. The duration of grinding and mixing is not specifically limited, but the mixing is performed at 100 rotations per minute for 24 hours by using a ball mill, for example.

Then, reaction of the mixed powder is performed in an electrical furnace at a temperature that is in the range from 750° C. to 950° C. for one to ten hours, thereby producing calcined powder (calcining process).

Then, the calcined powder is ground by using a mortar, and then the resultant product is mixed with pure water or is mixed with a liquid such as alcohol that is more volatile relative to pure water. The resultant product is ground and mixed by using a grinder such as a ball mill for an hour, for example.

Then, resultant calcined powder is mixed with, for example, predetermined amounts of a binder, solvent, dispersant, and plasticizer to produce a slurry. Then, the produced slurry is applied onto a film in a sheet-like manner and is then dried to produce a sheet-like calcined product. An electrode material is used to form a pattern on the sheet-like calcined product by a screen printing technique, and then the resultant product is dried. The produced sheet is attached to another similar sheet with a pressure being applied, thereby forming a layered product made of the material of the piezoelectric material layer 19 and made of the materials of the electrode layers 20 and 21.

A time period of 20 hours is taken to heat the layered product to a temperature of 650° C. in an electric furnace, and then the resultant product is held for two hours, thereby being degreased (degreasing process). Then, the resultant product is heated to a temperature that is in the range from 1000° C. to 1200° C. at a rate of 100° C. per hour. Then, the resultant product is sintered for 2 to 50 hours (sintering process), thereby producing the piezoelectric material layer 19 and the electrode layers 20 and 21. Although a bismuth sodium titanate-based piezoelectric material is generally sintered at a relatively high temperature, addition of zinc can decrease such a sintering temperature. Specifically, in the case where the piezoelectric material layer 19 contains an alloy of zinc and copper, the sintering temperature can be decreased in the range from 50° C. to 120° C. The sintering temperature is decreased in this manner, so that the materials of the electrode layers 20 and 21 are widely selected. For example, an electrode material that primarily contains nickel, silver, and palladium can be used. In addition, energy to be used during sintering can be reduced as compared with a typical technique, and therefore production costs can be reduced. The layered product is cut in a predetermined shape, and then electrode material paste or the like is applied onto a predetermined end surface of the piezoelectric material layer 19. The resultant product is heated at a predetermined temperature with the result that the electrode material paste or the like is baked, thereby producing the piezoelectric device-forming member 22.

Finally, an electric field is applied to the piezoelectric devices 18 in a single direction to pole the piezoelectric devices 18, thereby aligning the directions of polarization moments. In the embodiment, an electric field of, for example, 3 kV/mm is applied to the piezoelectric devices 18 for five minutes, thereby being able to sufficiently pole the piezoelectric devices 18.

In the embodiment, although the vertical vibration-type piezoelectric device 18 has been described in which the electrode layer 20, the piezoelectric material layer 19, and the electrode layer 21 are alternately stacked so as to extend in an axial direction, embodiments of the invention are not specifically limited to such a configuration. For example, embodiments of the invention can be applied to a flexural vibration-type piezoelectric device in which a first electrode, a piezoelectric material layer, and a second electrode are stacked on a substrate (channel forming substrate) in sequence.

For example, the piezoelectric material layer 19 may be produced by a known thin-film-forming technique such as a sputtering method, a sol-gel method, and a metal organic deposition (MOD) method.

Embodiments of the invention will be hereinafter described in more detail with reference to examples. In the examples, a piezoelectric device including a first electrode, a piezoelectric body, and a second electrode was produced. Meanwhile, embodiments of the invention are not limited to the following examples.

First Example

As the starting material of a piezoelectric material layer, bismuth trioxide ($Bi_2O_3$), sodium carbonate ($Na_2CO_3$), titanium dioxide ($TiO_2$), barium carbonate ($BaCO_3$), and zinc oxide (ZnO) were weighed so as to satisfy a predetermined composition ratio and were then mixed with ethanol. The resultant product was ground and mixed for 20 minutes by using a planetary ball mill and was then dried, thereby producing mixed powder. The mixed powder was calcined in an electric furnace under air atmosphere at a temperature of 850° C. for two hours, thereby producing calcined powder. Subsequently, the calcined powder was ground by using a mortar and was then mixed with ethanol. The resultant product was ground for 40 minutes by using a planetary ball mill and was then dried. Polyvinyl alcohol was added to the resultant powder and was then mixed by using a mortar. The resultant powder was formed into a pellet having a diameter of 1 cm and having a thickness of 1 mm by using a press molding machine. A time period of three hours was taken to heat the produced pellet to a temperature of 650° C., and the resultant product was then held for two hours to be degreased. Then, the resultant product was sintered at a temperature of 1080° C. for two hours, thereby producing a piezoelectric material layer made of composite oxide having an $ABO_3$ structure represented by the following general formula (I). In the general formula (I), the relationships of x=0.4650, y=0.0630, and z=0.0035 were provided.

$$(Bi_{1-x-y},Na_x,Ba_y)(Ti_{1-z},Zn_z)O_3 \quad (1)$$

Surfaces of the piezoelectric material layer that had been produced in this manner were polished. Subsequently, silver paste was applied onto the polished surfaces through printing, and then the resultant product was sintered at a temperature of 700° C. for 20 minutes with the result that a pair of electrode layers were formed on the two sides of the piezoelectric material layer in a thickness direction, thereby producing a piezoelectric device.

The produced piezoelectric device was immersed into silicone oil at a temperature of 25° C., and then an electric field of 3 kV/mm was applied to the piezoelectric device for five minutes in the immersed state with the result that the piezoelectric device was poled, thereby producing a piezoelectric device of the first example.

Second to Ninth Examples and First and Second Comparison Examples

The composition ratio of bismuth trioxide, sodium carbonate, titanium dioxide, barium carbonate, and zinc oxide was changed, and the composite oxide having the $ABO_3$ structure represented by the general formula (I) was used such that the values of x, y, and z were configured as illustrated in Table 1. The other configurations were the same as those in the first example, thereby producing piezoelectric devices.

First Reference Example

The composition ratio of bismuth trioxide, sodium carbonate, titanium dioxide, and barium carbonate was changed without zinc oxide such that the values of x and y were configured as illustrated in Table 1. Sintering was performed at a temperature of 1200° C. The other configurations were the same as those in the first example, thereby producing a piezoelectric device.

First Test Example

The piezoelectric constant (d33), relative permittivity ($\epsilon r$), and tan δ of each of the poled piezoelectric devices of the examples, comparison examples, and first reference example were measured by using a d33 meter (commercially available from Piezotest). The results of the measurement are illustrated in Table 1 and FIGS. 2 to 4.

TABLE 1

| | x | y | z | d33 (pC/N) | tanδ | ∈r |
|---|---|---|---|---|---|---|
| First Reference Example | 0.4700 | 0.0600 | 0.0000 | 142 | 0.040 | 735 |
| First Example | 0.4650 | 0.0630 | 0.0035 | 178 | 0.020 | 357 |
| Second Example | 0.4600 | 0.0720 | 0.0040 | 220 | 0.037 | 1114 |
| Third Example | 0.4640 | 0.0600 | 0.0053 | 221 | 0.036 | 1136 |
| Fourth Example | 0.4600 | 0.0680 | 0.0060 | 207 | 0.031 | 1080 |
| Fifth Example | 0.4700 | 0.0450 | 0.0075 | 183 | 0.031 | 852 |
| Sixth Example | 0.4600 | 0.0640 | 0.0080 | 188 | 0.027 | 1130 |
| Seventh Example | 0.4550 | 0.0720 | 0.0090 | 201 | 0.030 | 1073 |
| Eighth Example | 0.4600 | 0.0600 | 0.0100 | 173 | 0.046 | 1359 |
| Ninth Example | 0.4500 | 0.0750 | 0.0125 | 195 | 0.044 | 1332 |
| First Comparison Example | 0.4800 | 0.0340 | 0.0030 | 87 | 0.042 | 456 |
| Second Comparison Example | 0.4500 | 0.0700 | 0.0150 | 26 | 0.058 | 1579 |

Figure 2:
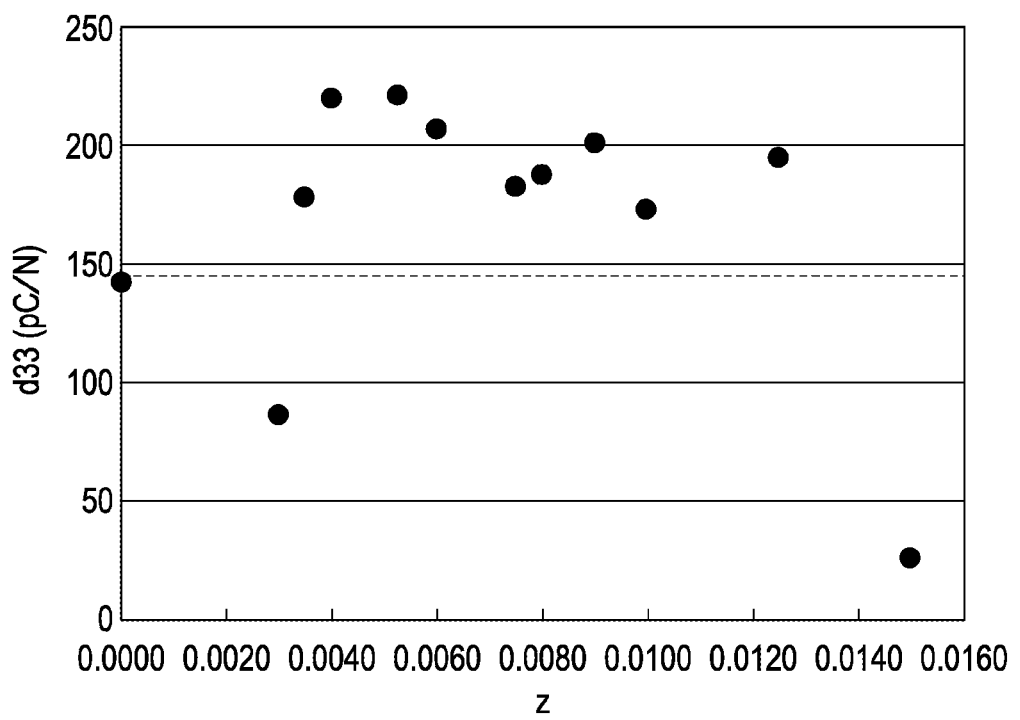
FIG. 2 illustrates a result of a first test example.

As illustrated in Table 1 and FIG. 2, each of the piezoelectric devices of the first to ninth examples, which had the relationship of 0.0035≤z≤0.0125 and had the ratio of zinc content to the total amount of titanium and zinc in the range from 0.35 mol % to 1.25 mol %, had a piezoelectric constant (d33) in the range from 173 to 221 (pC/N). Each of such piezoelectric devices had a piezoelectric constant larger than that of the zinc-free piezoelectric device of the first reference example.

Assuming that a strain amount is defined as S and that an electric field is defined as E, a piezoelectric constant (piezoelectric strain constant) d is represented by a formula $Si=dij \times Ei$. In the formula, i represents a strain direction, and j represents an applied voltage direction. The larger the value of the piezoelectric constant d is, the larger the strain of a piezoelectric material layer. It is noted that d33 is a piezoelectric strain constant given in the case where application of an electric field E3 generates a strain S3 in a direction parallel to a direction of the electric field E3. For example, d31 is a piezoelectric strain constant given in the case where application of an electric field E3 generates a strain S1 in a direction vertical to a direction of the electric field E3. It is noted that the numbers "1", "2", and "3" represent the x-axis direction, the y-axis direction and the z-axis direction, respectively.

Each of the piezoelectric devices of the first to ninth examples had a large piezoelectric constant (d33), and therefore each of these piezoelectric devices was assumed to also have a large piezoelectric constant (d31).

On the other hand, the piezoelectric device of the first comparison example, in which the ratio of zinc content to the total amount of titanium and zinc was 0.30 mol %, had a piezoelectric constant smaller than that of the piezoelectric device of the first reference example. Similarly, the piezoelectric device of the second comparison example, in which the ratio of zinc content to the total amount of titanium and zinc was 1.50 mol %, had a piezoelectric constant smaller than that of the piezoelectric device of the first reference example.

As a result, it was found that each of the piezoelectric devices having the following configurations had a large strain amount and excellent piezoelectric properties: the piezoelectric material layer was made of composite oxide having a perovskite structure represented by the general formula $ABO_3$; and the composite oxide contained bismuth, sodium, barium, titanium, and zinc; and the ratio of zinc content to the total amount of titanium and zinc was in the range from 0.35 mol % to 1.25 mol %.

Figure 3:
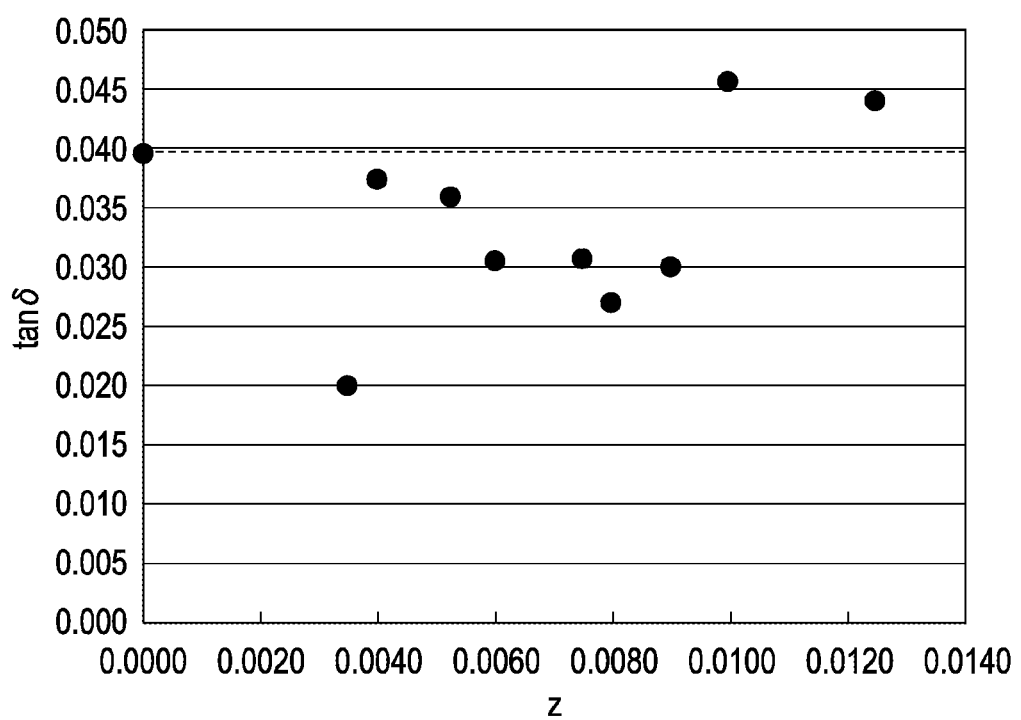
FIG. 3 illustrates another result of the first test example.

As illustrated in FIG. 3, each of the piezoelectric devices of the first to seventh examples, which had the relationship of $0.0035 \leq z \leq 0.0090$ and had the ratio of zinc content to the total amount of titanium and zinc in the range from 0.35 mol % to 0.90 mol %, had tan δ smaller than that of the zinc-free piezoelectric device of the first reference example. As a result, it was found that each of the piezoelectric devices having the ratio of zinc content to the total amount of titanium and zinc in the range from 0.35 mol % to 0.90 mol % had a large strain amount and small tan δ.

Figure 4:
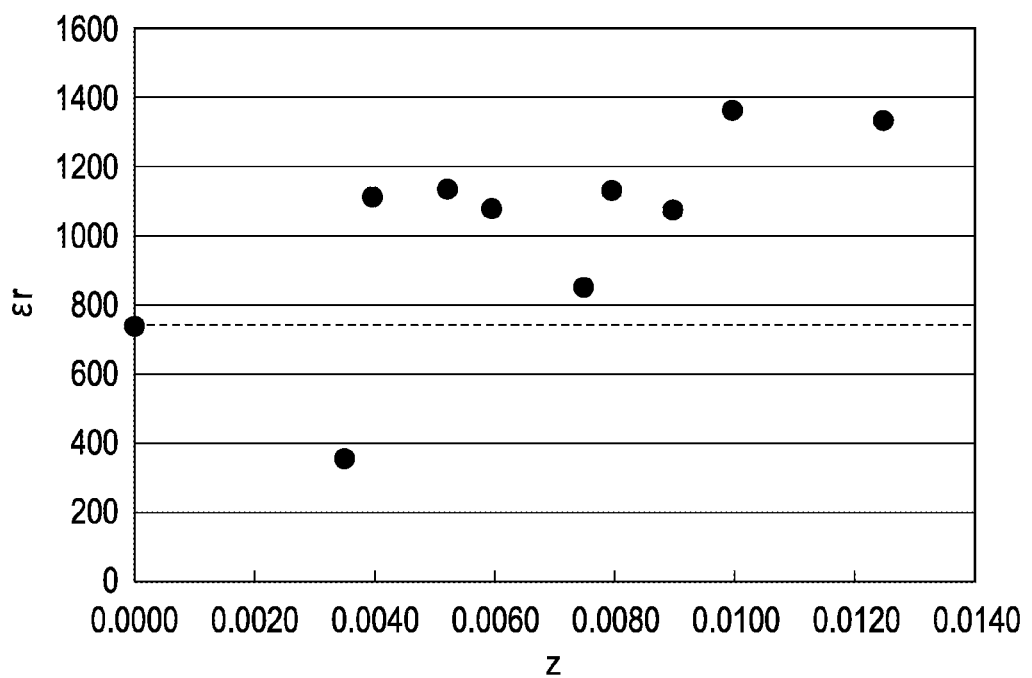
FIG. 4 illustrates another result of the first test example.

As illustrated in FIG. 4, each of the piezoelectric devices of the second to ninth examples, which had the relationship of $0.0040 \leq z \leq 0.0125$ and had the ratio of zinc content to the total amount of titanium and zinc in the range from 0.40 mol % to 1.25 mol %, had a relative permittivity larger than that of the zinc-free piezoelectric device of the first reference example. As a result, it was found that the piezoelectric devices having the ratio of zinc content to the total amount of titanium and zinc in the range from 0.40 mol % to 1.25 mol % had a large strain amount and large relative permittivity.

As a result, it was found that a piezoelectric device made of a piezoelectric material having a relationship of $0.0040 \leq z \leq 0.0090$ had a large piezoelectric constant, small tan δ, and large relative permittivity and especially had excellent piezoelectric properties.

Second Test Example

A system FCE-1A (commercially available from Toyo Corporation) was used to apply a triangular waveform of a frequency of 10 Hz to the piezoelectric devices of the second example and first reference example at a temperature of 25° C., and the relationship between P (polarization degree) and E (electric field) was obtained. The results are illustrated in FIGS. 5 and 6.

Figure 5:
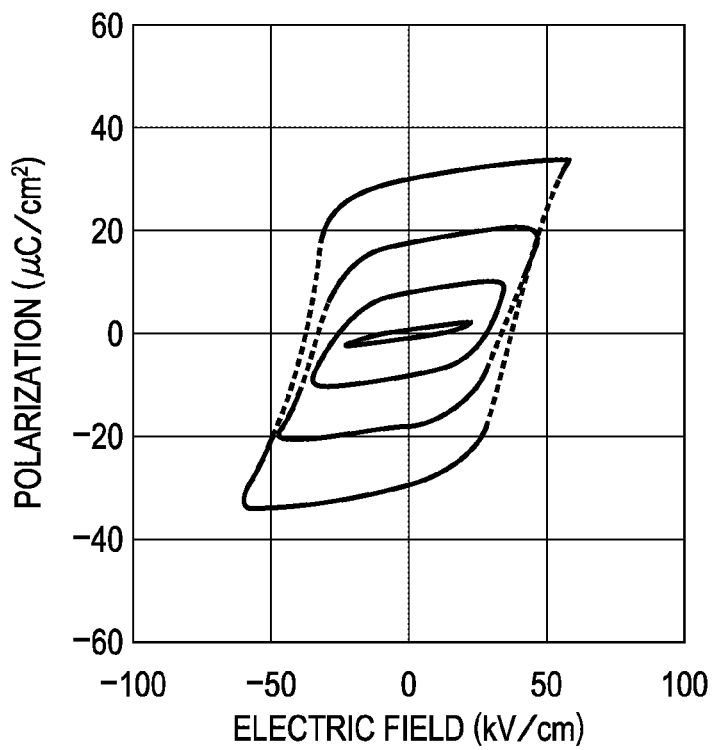
FIG. 5 illustrates the P-E curve of a second example.
Figure 6:
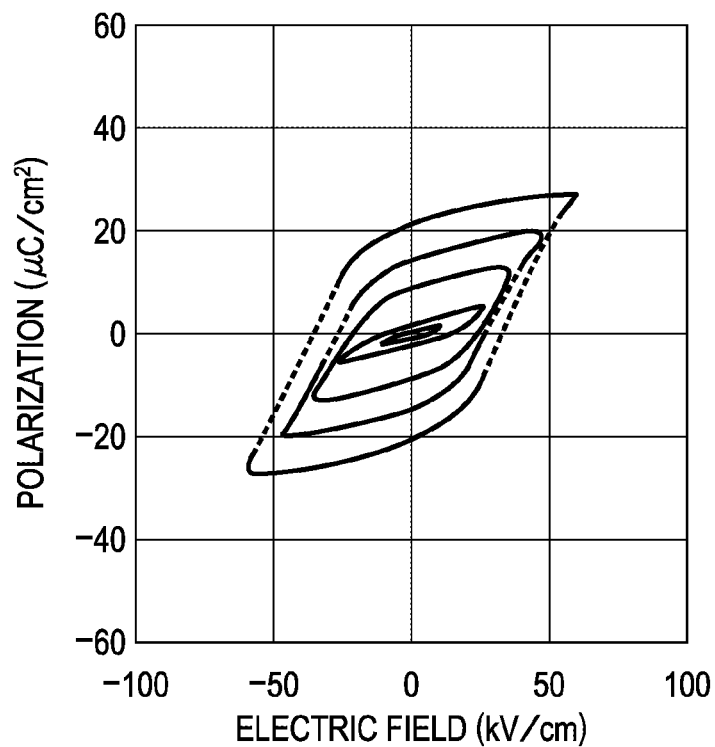
FIG. 6 illustrates the P-E curve of a first comparison example.

As illustrated in FIGS. 5 and 6, a hysteresis loop that is particular to ferroelectrics was observed in each of the piezoelectric devices of the second example and first reference example. In other words, it was confirmed that the piezoelectric devices of the second example and first reference example were ferroelectrics.

In the case where an electric field was 60 kV/cm, the piezoelectric device of the second example had a coercive electric field of Ec=37 kV/cm and had a remanent polarization value of Pr=30 $\mu C/cm^2$, and the piezoelectric device of the first reference example had a coercive electric field of Ec=33 kV/cm and had a remanent polarization value of Pr=21 $\mu C/cm^2$. As a result, it was found that the piezoelectric device of the second example had a large remanent polarization value and excellent ferroelectricity and adequately served to decrease the size of a piezoelectric device, relative to the piezoelectric device of the first reference example. In addition, it was also found that the piezoelectric device of the second example had excellent piezoelectric properties.

Tenth Example

As the starting material of the piezoelectric material layer, bismuth trioxide ($Bi_2O_3$), sodium carbonate ($Na_2CO_3$), titanium dioxide ($TiO_2$), barium carbonate ($BaCO_3$), zinc oxide (ZnO), and lithium carbonate ($Li_2CO_3$) were weighed so as to satisfy a predetermined composition ratio. The piezoelectric material layer was made of a composite oxide having the $ABO_3$ structure represented by the following general formula (I) such that the relationships of x=0.4600, y=0.0680, and z=0.0060 were satisfied in the general formula (1) and such that the 5 mol % part of sodium was replaced by lithium. The other configurations were the same as those in the first example, thereby producing a piezoelectric device.

$$(Bi_{1-x-y},Na_x,Ba_y)(Ti_{1-z},Zn_z)O_3 \quad (1)$$

Eleventh to Thirteenth Examples and Third and Fourth Comparison Examples

The composition ratios of sodium carbonate and lithium carbonate were changed. The composite oxide having the $ABO_3$ structure represented by the general formula (I) was used such that the relationships of x=0.4600, y=0.0680, and z=0.0060 were satisfied. A ratio (mol %) of lithium content to the total amount of sodium and lithium was configured as illustrated in Table 2. The other configurations were the same as those in the tenth example, thereby producing piezoelectric devices.

Third Test Example

The piezoelectric constant (d33), relative permittivity (∈r), and tan δ of each of the poled piezoelectric devices of the examples and comparison examples were measured by using a d33 meter (commercially available from Piezotest). The results of the measurement are illustrated in Table 2 and FIG. 7.

TABLE 2

| | Li (molar ratio) | Na (molar ratio) | Ratio of Li to the total amount of Na and Li (mol %) | d33 (pC/N) | tanδ | εr |
|---|---|---|---|---|---|---|
| Fourth Example | 0.0000 | 0.4600 | 0 | 207 | 0.031 | 1080 |
| Tenth Example | 0.0230 | 0.4370 | 5 | 219 | 0.039 | 1051 |
| Eleventh Example | 0.0276 | 0.4324 | 6 | 225 | 0.046 | 1123 |
| Twelfth Example | 0.0322 | 0.4278 | 7 | 230 | 0.052 | 1212 |
| Thirteenth Example | 0.0368 | 0.4232 | 8 | 213 | 0.062 | 1371 |
| Third Comparison Example | 0.0460 | 0.4140 | 10 | 13 | 0.054 | 1360 |
| Fourth Comparison Example | 0.1380 | 0.3220 | 30 | 0 | 0.101 | 928 |

Figure 7:
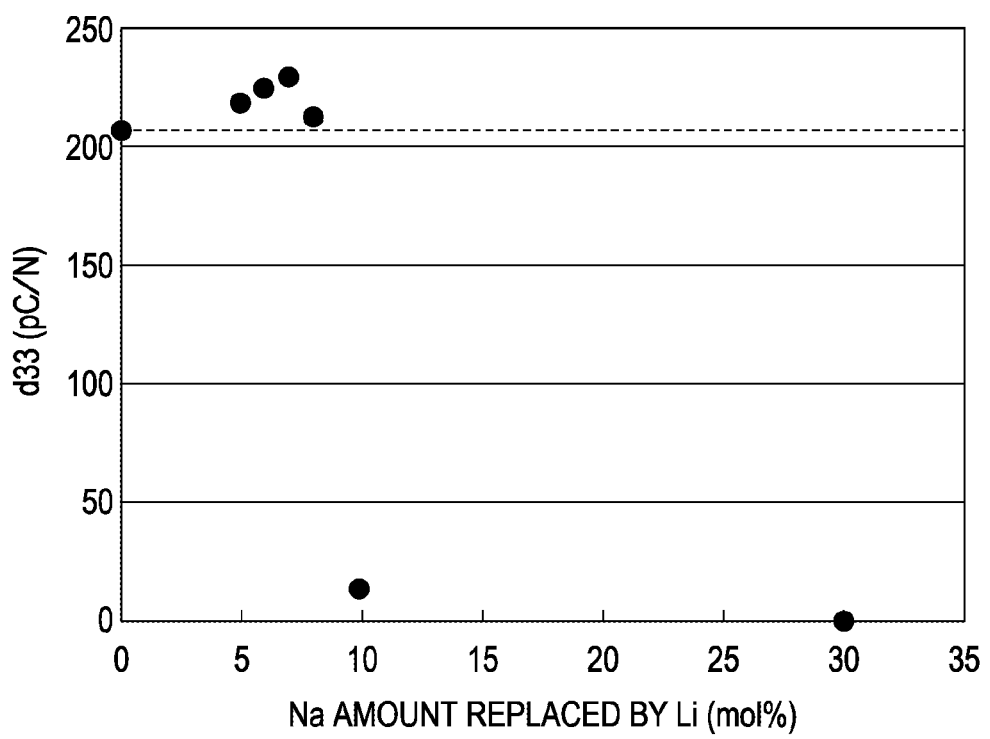
FIG. 7 illustrates a result of a third test example.

As illustrated in Table 2 and FIG. 7, each of the piezoelectric devices of the tenth to thirteenth examples, in which the ratio of lithium content to the total amount of sodium and lithium was in the range from 5 mol % to 8 mol %, had a further large piezoelectric constant (d33) relative to the lithium-free piezoelectric device of the fourth example.

In contrast, the piezoelectric devices of the third and fourth comparison examples, which respectively had ratios of lithium content to the total amount of sodium and lithium of 10 mol % and 30 mol %, had significantly small piezoelectric constants, resulting in being inadequate for piezoelectric devices.

As a result, in the case where the piezoelectric material layer was made of composite oxide having the perovskite structure represented by the general formula $ABO_3$, in the case where the composite oxide contained bismuth, sodium, barium, titanium, and zinc, and in the case where the composite oxide had the ratio of zinc content to the total amount of titanium and zinc in the range from 0.35 mol % to 1.25 mol %, it was found that part of sodium content was replaced by lithium in an amount from 5 mol % to 8 mol % with the result that the piezoelectric constant d33 was further increased.

Figure 8:
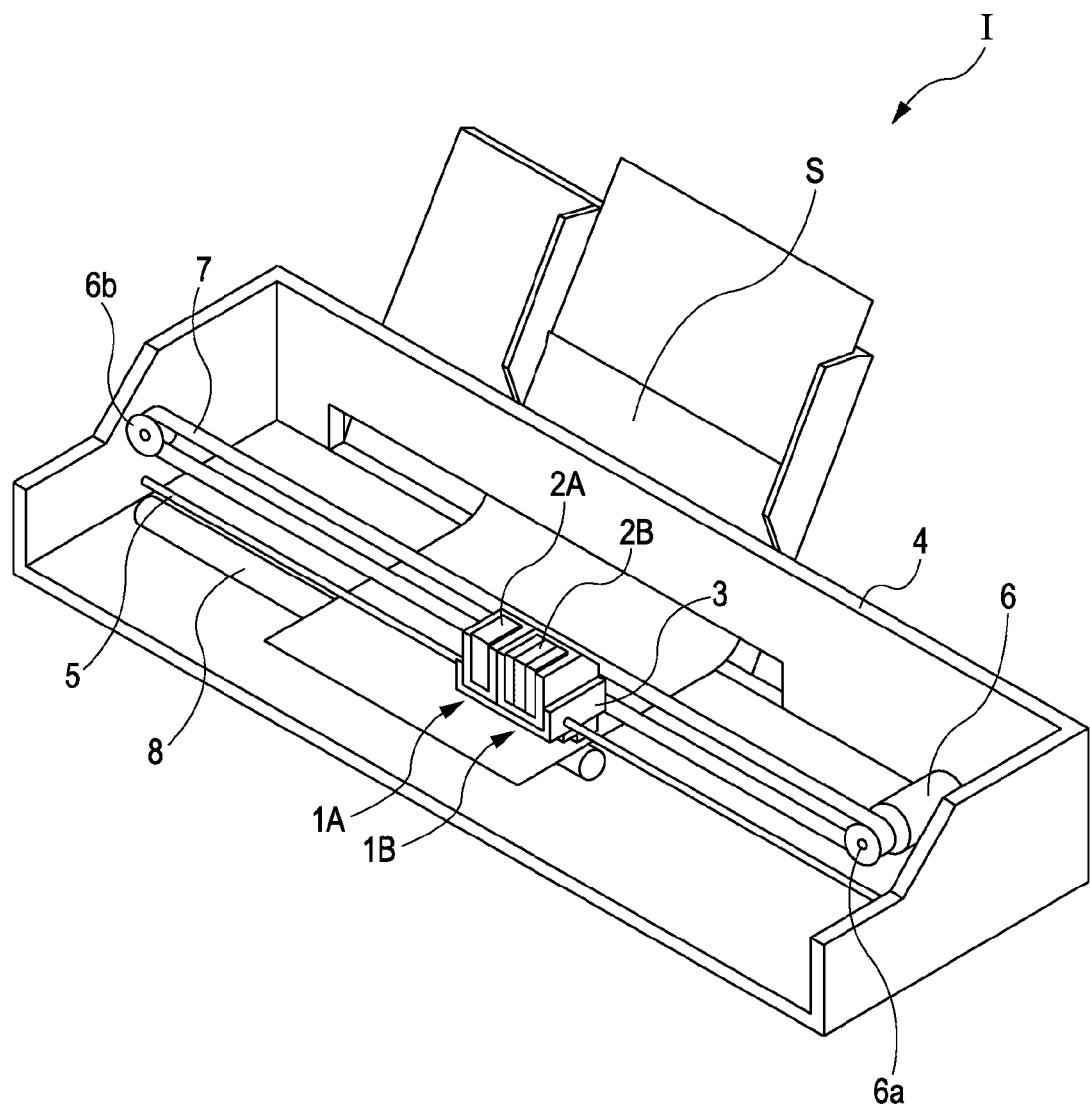
FIG. 8 illustrates a perspective view schematically illustrating a recording apparatus according to the first embodiment of the invention.

The ink jet recording head 10 having such configurations is formed as part of a recording head unit having an ink channel and is provided on an ink jet recording apparatus, the ink channel being in communication with an ink cartridge or the like. FIG. 8 schematically illustrates an example of such an ink jet recording apparatus.

For example, the liquid ejecting apparatus of the embodiment is provided as an ink jet recording apparatus I. With reference to FIG. 8, ink cartridges 2A and 2B are respectively provided on recording head units 1A and 1B so as to be able to be removed, the recording head units 1A and 1B having the ink jet recording heads 10, and the ink cartridges 2A and 2B forming supplying units that supply ink to the ink jet recording heads 10. A carriage 3 on which the recording head units 1A and 1B are mounted is attached to a carriage shaft 5 so as to be able to be moved in an axial direction, the carriage shaft 5 being fixed to an apparatus body 4. The recording head units 1A and 1B respectively eject a black ink composition and a color ink composition.

A driving motor 6 is provided in the vicinity of an end of the carriage shaft 5. A first pulley 6a is provided at an end of the shaft of the driving motor 6, and a groove is formed in the circumference of the first pulley 6a. A second pulley 6b that is paired with the first pulley 6a of the driving motor 6 is provided in the vicinity of the other end of the carriage shaft 5 so as to be able to be rotated. A timing belt 7 having an annular shape and made of an elastic member is looped between the first pulley 6a and the second pulley 6b.

The driving motor 6 outputs a driving force to the carriage 3 through the timing belt 7, so that the carriage 3 on which the recording head units 1A and 1B are provided is moved along the carriage shaft 5. Furthermore, a platen 8 is provided on the apparatus body 4 so as to be parallel to the carriage 3. The platen 8 is configured so as to be rotated by a driving force from a paper feed motor (not illustrated). A recording sheet S which is a recording medium such as paper that has been fed by a paper feed roller or the like is wound around the platen 8 to be transported.

In the example illustrated in FIG. 8, each of the ink jet recording head units 1A and 1B is configured so as to have a single ink jet recording head 10 but is not specifically limited to such a configuration. For example, each of the ink jet recording head units 1A and 1B may be configured so as to have two or more ink jet recording heads 10.

Another Embodiment

Although the embodiment of the invention has been described, basic configurations of embodiments of the invention are not limited to the above embodiment. In the ink jet recording apparatus I, the ink jet recording heads (head units 1A and 1B) are provided on the carriage 3 and are moved in a main scanning direction. However, embodiments of the invention are not limited to such a configuration. For example, embodiments of the invention can be also applied to a so-called line-type recording apparatus in which the ink jet recording head 10 is fixed and in which printing is performed as a result of the recording sheet S such as paper being moved in a sub scanning direction.

In the first embodiment, although the ink jet recording head is employed to describe an example of the liquid ejecting head, embodiments of the invention are widely directed to general liquid ejecting heads and can be obviously applied to a liquid ejecting head that ejects a liquid other than ink. Examples of other liquid ejecting heads include various types of recording heads used for image recording apparatus such as printers; a color material ejecting head used for manufacturing a color filter of a liquid crystal display or the like; an electrode material ejecting head used for forming an electrode of an organic electro-luminescence (EL) display, a field emission display (FED), or the like; and a living-organic material ejecting head used for manufacturing a biochip.

What is claimed is:

1. A liquid ejecting head comprising:
   a pressure generating chamber communicating with a nozzle opening; and
   a piezoelectric actuator having
   an electrode and
   a piezoelectric material consisting of composite oxide, wherein the composite oxide contains bismuth, sodium, barium, titanium, and zinc, and does not contain niobium;
   a ratio of zinc content to the total amount of titanium and zinc is 0.35 mol % or more and 1.25 mol % or less; and
   a ratio of barium content to the total amount of bismuth, sodium and barium is 4.5 mol % or more and 7.5 mol % or less.

2. The liquid ejecting head according to claim 1, wherein a ratio of zinc content to the total amount of titanium and zinc is 0.90 mol % or more.

3. The liquid ejecting head according to claim 1, wherein a ratio of zinc content to the total amount of titanium and zinc is 0.40 mol % or more.

4. A liquid ejecting apparatus comprising the liquid ejecting head according to claim 1.

5. A piezoelectric device comprising:
- a piezoelectric material consisting of a composite oxide, wherein the composite oxide contains bismuth, sodium, barium, titanium, and zinc and does not contain niobium;
- a ratio of zinc content to the total amount of titanium and zinc is 0.35 mol % or more and 1.25 mol % or less; and
- a ratio of barium content to the total amount of bismuth, sodium and barium is 4.5 mol % or more and 7.5 mol % or less.

6. The liquid ejecting head according to claim 1, wherein the composite oxide further contains an element selected from a group consisting of lithium, potassium, rubidium, cesium, silver, magnesium, calcium, and strontium, and wherein and a ratio of sodium with the selected element to the total amount of bismuth, sodium, barium, and the selected element is 41.0 mol % or more and 49.0 mol % or less.

7. The piezoelectric device according to claim 5, wherein the composite oxide further contains an element selected from a group consisting of lithium, potassium, rubidium, cesium, silver, magnesium, calcium, and strontium, and wherein and a ratio of sodium with the selected element to the total amount of bismuth, sodium, barium, and the selected element is 41.0 mol % or more and 49.0 mol % or less.

* * * * *